United States Patent [19]
Press

[11] 3,848,321
[45] Nov. 19, 1974

[54] METHOD OF FABRICATING A CONSTRICTABLE TUBE VALVE ELEMENT

[75] Inventor: Irving D. Press, West Orange, N.J.

[73] Assignee: Resistoflex Corporation, Roseland, N.J.

[22] Filed: July 16, 1973

[21] Appl. No.: 379,248

Related U.S. Application Data

[62] Division of Ser. No. 162,407, July 14, 1971, Pat. No. 3,791,617.

[52] U.S. Cl. ............ 29/432.2, 29/157.1 R, 29/526, 29/527.1, 264/138, 264/209, 264/150
[51] Int. Cl. ............................................ B23p 11/00
[58] Field of Search ............ 29/157.1 R, 432, 432.2, 29/526, 527.1; 264/209, 138, 150; 251/5, 8, 7, 10

[56] References Cited
UNITED STATES PATENTS

| | | | |
|---|---|---|---|
| 2,125,001 | 7/1938 | Cowen et al. | 264/150 |
| 2,467,150 | 4/1949 | Nordell | 251/5 X |
| 2,763,895 | 9/1956 | Desersek | 264/138 |
| 3,396,448 | 8/1968 | Kisling | 29/157.1 R |
| 3,451,120 | 6/1969 | Herzig et al. | 29/157.1 R |
| 3,529,338 | 9/1970 | Clapp | 29/157.1 R |
| 3,558,410 | 1/1971 | Quackenbush et al. | 264/209 X |

FOREIGN PATENTS OR APPLICATIONS

| | | | |
|---|---|---|---|
| 582,032 | 11/1946 | Great Britain | 251/8 |
| 1,040,349 | 8/1966 | Great Britain | 251/5 |

*Primary Examiner*—Charlie T. Moon
*Attorney, Agent, or Firm*—Watson, Leavenworth, Kelton & Taggart

[57] ABSTRACT

A tube of P.T.F.E. resin with external bosses is produced by extruding the tube with external longitudinal ribs followed by removing sections of said ribs to leave said bosses. Thereupon connecting elements are secured to said bosses.

4 Claims, 5 Drawing Figures

PATENTED NOV 19 1974 3,848,321
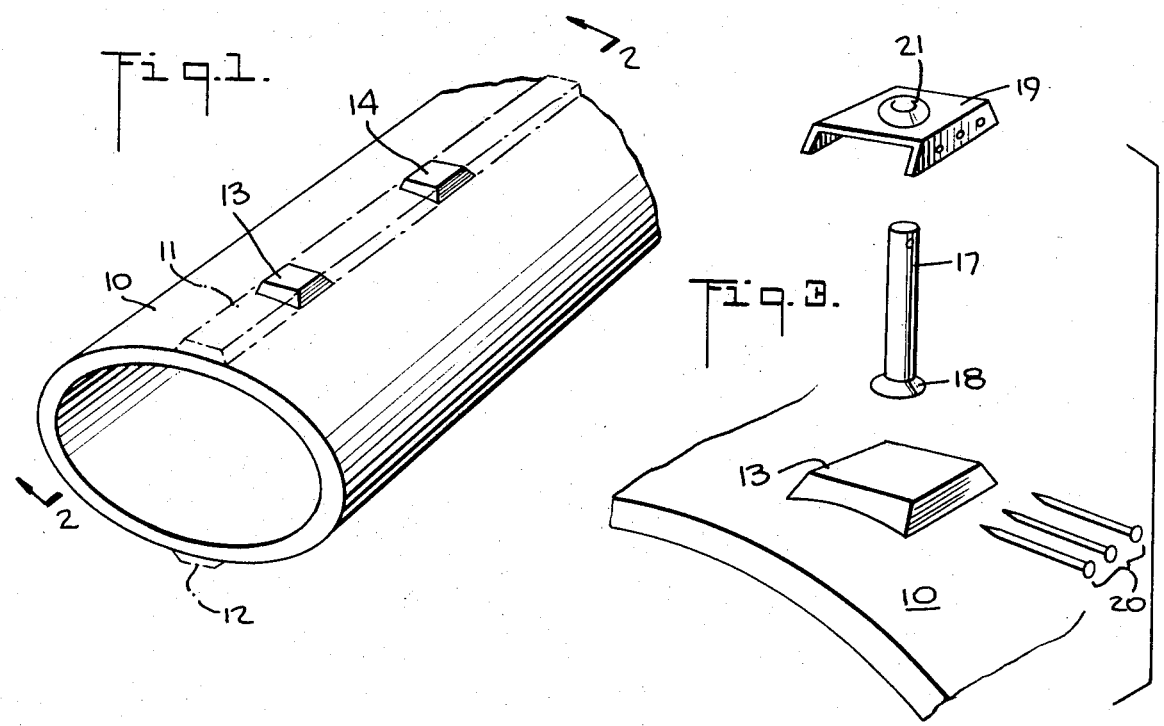
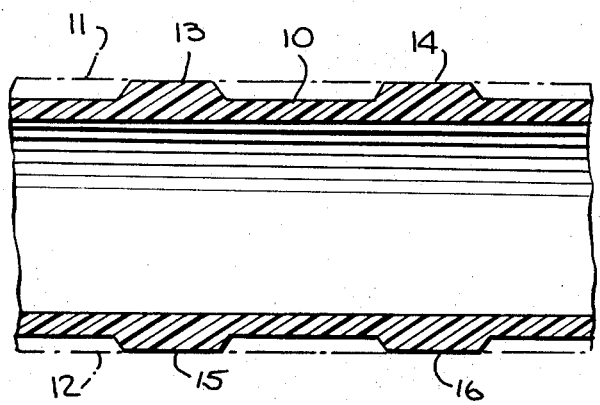

METHOD OF FABRICATING A CONSTRICTABLE TUBE VALVE ELEMENT

This application is a division of my copending application Ser. No. 162,407 filed July 14, 1971, now U.S. Pat. No. 3,791,617 for a "POSITIVE OPENING AND CLOSING CONSTRICTABLE TUBE VALVE WITH MEANS FOR PROLONGING TUBE LIFE."

In said application, there is disclosed and claimed a valve of the type in which a constrictable tube is mechanically flattened to form a barrier to the flow of fluid material therethrough. The constrictable tube is made of flexible plastic having two bosses spaced apart along a longitudinal element on one side of the tube and two further bosses similarly spaced along a longitudinal element on the diametrically opposite side of the tube such that pairs of said bosses are in substantially diametral opposition. Individual connecting elements are secured to a corresponding one of said bosses for interconnecting said bosses with compressor members forming a part of the actuating mechanism for said valve.

The present invention is directed to a method of fabricating a flexible plastic tube especially suited for said constrictable tube valve disclosed and claimed in my aforesaid application. In addition, as will appear hereinafter, said constrictable tube may find use in other devices wherein it is necessary to establish physical connection with the exterior of the tube to apply radially outward force thereto without unduly thickening the tube walls and interfering with the flexibility thereof.

More particularly, the present method is directed to the fabrication of a constrictable tube from polytetrafluoroethylene resin (P.T.F.E.) or similar plastic requiring special fabricating techniques.

In accordance with the present invention, there is provided a method of fabricating such tube which comprises the steps of extruding a tube of flexible plastic having a generally uniform wall thickness except for two ribs of greater radial dimension extending longitudinally of the tube on the radially outer surface thereof, said ribs being located along diametrically opposite elements of the tube. This is followed by removing longitudinal sections of said ribs to leave said bosses, and thereupon affixing said connecting elements to said bosses.

The invention will be better understood after reading the following detailed description with reference to the appended drawings in which:

FIG. 1 is a perspective view of the tube element illustrating steps in the method before attachment of the connecting elements;

FIG. 2 is a longitudinal sectional view taken along line 2—2 in FIG. 1;

FIG. 3 is an exploded fragmentary view showing the components which make up a connecting element;

FIG. 4 is a fragmentary perspective view showing the assembly of the components of FIG. 3; and FIG. 5 is a fragmentary sectional view taken along the line 5—5 in FIG. 4.

The same reference numerals are used throughout the drawings to designate the same or similar parts.

Reference should now be had to the figures of the drawings wherein the tube is generally designated by the numeral 10. Said tube is produced by extrusion so as to have a generally uniform wall thickness except for the two ribs 11 and 12, as shown in FIGS. 1 and 2, of greater radial dimension extending longitudinally of the tube on the radially outer surface thereof. The ribs 11 and 12 are located along diametrically opposite elements of the tube.

As is well known, P.T.F.E. resin is extruded in powdered form followed by sintering. It is presently preferred to employ the extrusion process commonly referred to as "paste extrusion." For further details, reference can be had to the method set forth in U.S. Pat. No. 2,752,637 issued July 3, 1956, and assigned to the same assignee as the present application.

After sintering the resin, longitudinal sections of the ribs are removed by machining in order to leave the bosses 13 through 16. Thereupon the connecting elements may be affixed to the corresponding bosses.

A typical assembly of such connecting elements is illustrated in FIGS. 3, 4 and 5, wherein the element is shown as consisting of a pin 17 with a radially enlarged head 18. The means for attaching the pin 17 to the boss, e.g., 13, comprises a metal cap 19 overlying the boss and attached thereto with a plurality of pins 20. The pinhead 18 is captured between the boss and the cap with the pin projecting through an aperture 21 in the cap 19. Some play should be allowed between the pin and the cap so that the pin is free to articulate relative to the boss 13. It is to be understood that various other arrangements may be employed for joining a connecting element to the boss for interconnecting the same with the compressor member in the tube valve referred to aforesaid. The specific arrangement illustrated in FIGS. 3, 4 and 5 is intended only as an example.

Having described the presently preferred embodiment of the invention, it should be understood that various changes in construction may be made without departing from the true spirit of the invention as defined in the appended claims.

What is claimed is:

1. The method of fabricating a flexible plastic tube for a constrictable tube valve with the tube having two bosses spaced apart along a longitudinal element on one side of the tube and two further bosses similarly spaced along a longitudinal element on the diametrically opposite side of the tube such that pairs of said bosses are in substantially diametral opposition, and with individual connecting elements secured to a corresponding one of said bosses, said method comprising the steps of extruding a tube of flexible plastic having a generally uniform wall thickness except for two ribs of greater radial dimension extending longitudinally of the tube on the radially outer surface thereof, said ribs being located along diametrically opposite elements of the tube, removing longitudinal sections of said ribs to leave said bosses, and thereupon affixing said connecting elements to said bosses.

2. The method according to claim 1, wherein said tube is extruded from a paste mixture of P.T.F.E. resin and a lubricant, and then sintered prior to the step of removing said longitudinal sections.

3. The method of fabricating a flexible plastic tube having at least one boss on the outer surface thereof with a connecting element secured to said boss, said method comprising the steps of extruding a tube of flexible plastic having a generally uniform wall thickness except for a rib of greater radial dimension extending longitudinally of the tube on the radially outer surface thereof along an element passing through the desired location of said boss, removing longitudinal sections of said rib to leave said boss, and thereupon affixing said connecting element to said boss.

4. The method according to claim 3, wherein said tube is extruded from a paste mixture of P.T.F.E. resin and a lubricant, and then sintered prior to the step of removing said longitudinal sections.

* * * * *